United States Patent
Inamoto

(10) Patent No.: US 11,247,797 B2
(45) Date of Patent: Feb. 15, 2022

(54) METHOD FOR PACKAGING FACILITATED TRANSPORT MEMBRANE

(71) Applicant: SUMITOMO CHEMICAL COMPANY, LIMITED, Tokyo (JP)

(72) Inventor: Kazuya Inamoto, Osaka (JP)

(73) Assignee: SUMITOMO CHEMICAL COMPANY, LTD., Tokyo (JP)

( * ) Notice: Subject to any disclaimer, the term of this patent is extended or adjusted under 35 U.S.C. 154(b) by 329 days.

(21) Appl. No.: 16/484,729

(22) PCT Filed: Jan. 24, 2018

(86) PCT No.: PCT/JP2018/002134
§ 371 (c)(1),
(2) Date: Aug. 8, 2019

(87) PCT Pub. No.: WO2018/150827
PCT Pub. Date: Aug. 23, 2018

(65) Prior Publication Data
US 2020/0055622 A1    Feb. 20, 2020

(30) Foreign Application Priority Data
Feb. 14, 2017    (JP) .............................. JP2017-025199

(51) Int. Cl.
*B65B 31/02*    (2006.01)
*B01D 53/22*    (2006.01)
(Continued)

(52) U.S. Cl.
CPC .............. *B65B 31/02* (2013.01); *B01D 53/22* (2013.01); *B01D 65/006* (2013.01); *B65B 31/04* (2013.01); *B65D 81/2069* (2013.01)

(58) Field of Classification Search
CPC ......................... B01D 65/006; B01D 67/0097
See application file for complete search history.

(56) References Cited

U.S. PATENT DOCUMENTS 3,322,266 A * 5/1967 Lontzjohnf ........ B01D 67/0097
                                                                       206/205
4,968,331 A * 11/1990 Sakashita ............... B01D 71/48
                                                                      210/500.28
(Continued)

FOREIGN PATENT DOCUMENTS

CA        2198520 A1    4/1998
CN      104379241 A    2/2015
(Continued)

OTHER PUBLICATIONS

Japanese Office Action issued in corresponding Japanese Patent Application No. 2017-025199, dated Nov. 17, 2020, with partial English translation.
(Continued)

*Primary Examiner* — Hemant Desai
*Assistant Examiner* — Tanzim Imam
(74) *Attorney, Agent, or Firm* — McDermott Will & Emery LLP

(57) ABSTRACT

Provided is a means which makes it possible to prevent quality deterioration of a facilitated transport membrane for a long period of time. A method for packing the facilitated transport membrane selectively allowing a specific gas to permeate therethrough, includes the steps of: putting the facilitated transport membrane in a packaging body having a transmission rate of not more than 10,000 cm$^3$/(m$^2$·24 h·atm) for the specific gas; preventing a contact between the facilitated transport membrane and the specific gas; and lastly sealing the packaging body.

8 Claims, 2 Drawing Sheets

(51) Int. Cl.
  *B01D 65/00* (2006.01)
  *B65B 31/04* (2006.01)
  *B65D 81/20* (2006.01)

(56) References Cited

U.S. PATENT DOCUMENTS

| | | | | |
|---|---|---|---|---|
| 5,500,036 | A * | 3/1996 | Kalthod | B01D 53/22 95/54 |
| 7,938,940 | B2 * | 5/2011 | Kawahara | B01D 63/06 204/295 |
| 8,999,039 | B2 * | 4/2015 | Hilbig | B01D 69/02 95/54 |
| 2006/0016750 | A1 | 1/2006 | Merkel et al. | |
| 2010/0116132 | A1 * | 5/2010 | Staiger | C01B 13/027 95/54 |
| 2011/0036237 | A1 | 2/2011 | Okada et al. | |
| 2012/0219718 | A1 | 8/2012 | Okada et al. | |
| 2013/0160650 | A1 * | 6/2013 | Okada | C01B 3/16 96/12 |
| 2015/0165390 | A1 | 6/2015 | Hiranabe et al. | |
| 2016/0008764 | A1 | 1/2016 | Yoneyama | |
| 2016/0082400 | A1 | 3/2016 | Kurahashi et al. | |
| 2016/0136581 | A1 | 5/2016 | Sawada et al. | |
| 2016/0375411 | A1 * | 12/2016 | Lin | B01D 71/022 428/316.6 |
| 2017/0203254 | A1 * | 7/2017 | Miyahara | B65D 65/38 |

FOREIGN PATENT DOCUMENTS

| | | |
|---|---|---|
| CN | 105120989 A | 12/2015 |
| CN | 105228735 A | 1/2016 |
| CN | 105451864 A | 3/2016 |
| DE | 102006036863 A1 | 2/2008 |
| EP | 1 098 569 A1 | 5/2001 |
| JP | H01310714 A * | 12/1989 ............ B01D 53/22 |
| JP | 06-278775 A | 10/1994 |
| JP | 2005-066389 A | 3/2005 |
| JP | 2006-335362 A | 12/2006 |
| JP | 4621295 B2 | 1/2011 |
| JP | 2013-169976 A | 9/2013 |
| JP | 2014-014811 A | 1/2014 |
| JP | 2014-226650 A | 12/2014 |
| JP | 2015-054696 A | 3/2015 |
| WO | 2016/072421 A1 | 5/2016 |
| WO | WO-2016072421 A1 * | 5/2016 ............ B65B 11/50 |

OTHER PUBLICATIONS

Extended European Search Report issued in corresponding European Patent Application No. 18754682.5-1104, dated Jan. 29, 2020.
Chinese Office Action issued in corresponding Chinese Patent Application No. 201880011437.1, dated Apr. 19, 2021, with English translation.
English translation of the International Search Report issued in corresponding International Patent Application No. PCT/JP2018/002134, dated Mar. 13, 2018.
English translation of the International Preliminary Report on Patentability issued in International Patent Application No. PCT/JP2018/002134, dated Aug. 29, 2019.
English translation of the Written Opinion of the International Searching Authority issued in International Patent Application No. PCT/JP2018/002134, dated Mar. 13, 2018.
Second Chinese Office Action issued in corresponding Chinese Patent Application No. 201880011437.1, dated Aug. 30, 2021, with English translation.

* cited by examiner

METHOD FOR PACKAGING FACILITATED TRANSPORT MEMBRANE

CROSS REFERENCE

This application is the U.S. National Phase under 35 U.S.C. § 371 of International Application No. PCT/JP2018/002134, filed on Jan. 24, 2018, which claims the benefit of Japanese Application No. 2017-025199, filed on Feb. 14, 2017, the entire contents of each are hereby incorporated by reference.

TECHNICAL FIELD

The present invention relates to a method for packing a facilitated transport membrane, a facilitated transport membrane package, and a method for producing the facilitated transport membrane package. More specifically, the present invention relates to a method for packing a facilitated transport membrane, a facilitated transport membrane roll and a facilitated transport membrane element, a facilitated transport membrane package, and a method for producing the facilitated transport membrane package, each of which makes it possible to prevent quality deterioration of the facilitated transport membrane for a long period of time.

BACKGROUND ART

In recent years, technical development has been advanced for selectively separating, from a mixed gas (process gas), a specific gas containing an acid gas such as carbon dioxide ($CO_2$). For example, Patent Literature 1 discloses a $CO_2$ separation test apparatus, in which (i) a $CO_2$-facilitated transport membrane is fixed between a feed-side chamber and a permeation-side chamber of a flow type gas permeation cell made of stainless steel, (ii) a feed gas (mixed gas of $CO_2$, $H_2$ and $H_2O$) is fed to the feed-side chamber, and (iii) $CO_2$, which has been selectively separated (allowed to permeate) through the $CO_2$-facilitated transport membrane, is discharged from the permeation-side chamber. The $CO_2$ separation test apparatus disclosed in Patent Literature 1 is a so-called separation membrane module with the use of a facilitated transport membrane. The facilitated transport membrane disclosed in Patent Literature 1 includes therein a carrier which reversibly reacts with the specific gas. With the use of the carrier, the specific gas is selectively allowed to permeate through the facilitated transport membrane. As a result, the specific gas is separated from the mixed gas containing the specific gas.

In cases where such a facilitated transport membrane or a structure containing the facilitated transport membrane (e.g., a facilitated transport membrane roll obtained by winding a sheet of the facilitated transport membrane or a facilitated transport membrane element in which the facilitated transport membrane is used) is stored or transported, the structure is in general packed in a publicly known packaging material such as a foamed shock-absorbing material. This is intended to prevent a foreign substance from entering the structure and to prevent the structure from being externally-damaged due to a contact between such structures or a contact between the structure and another object, during storage or transportation.

CITATION LIST

Patent Literature

[Patent Literature 1]
Japan Patent No. 4621295

SUMMARY OF INVENTION

Technical Problem

However, there has been a problem that after the facilitated transport membrane (facilitated transport membrane roll, facilitated transport membrane element, etc.) is stored for a long period of time, the facilitated transport membrane may have deteriorated separation selectivity.

One or more embodiments of the present invention are attained in view of the above problem. An object of an embodiment of the present invention is to provide a method for packing a facilitated transport membrane, which method makes it possible to prevent quality deterioration of the facilitated transport membrane for a long period of time during storage and transportation of the facilitated transport membrane. Further, other objects of embodiments of the present invention are to provide a facilitated transport membrane package which is capable of preventing quality deterioration of the facilitated transport membrane for a long period of time, and a method for producing the facilitated transport membrane package.

Solution to Problem

The present invention encompasses the following inventions [1] to [9].
[1] A method for packing a facilitated transport membrane selectively allowing a specific gas to permeate therethrough, the method including the steps of: putting the facilitated transport membrane in a packaging body having a transmission rate of not more than 10,000 $cm^3$/ ($m^2 \cdot 24$ h·atm) for the specific gas; preventing a contact between the facilitated transport membrane and the specific gas; and lastly sealing the packaging body.
[2] The method as set forth in [1], wherein: in the step of preventing a contact between the facilitated transport membrane and the specific gas, an inert gas is introduced into the packaging body.
[3] The method as set forth in [2], wherein: the inert gas is introduced into the packaging body so as to replace a gas inside the packaging body.
[4] The method as set forth in [2], wherein: with regard to a ratio of a volume of the facilitated transport membrane to a volume of gas inside the packaging body at a time point when the packaging body is sealed, the ratio is adjusted so as to be in a range of not less than 0.1 and not more than 10,000.
[5] The method as set forth in any one of [1] to [3], wherein: with regard to a relative humidity of gas inside the packaging body at a time point when the packaging body is sealed, the relative humidity is adjusted so as to be in a range of not less than 30% RH and not more than 90% RH at 23° C.
[6] The method as set forth in any one of [1] to [5], wherein: the specific gas is an acid gas.
[7] The method as set forth in [6], wherein: the acid gas is carbon dioxide.
[8] A method for producing a facilitated transport membrane package, in which a facilitated transport membrane selectively allowing a specific gas to permeate therethrough is enclosed in a packaging body, the method including the steps of: putting the facilitated transport membrane in the packaging body having a transmission rate of not more than 10,000 cm$^3$/(m$^2$·24 h·atm) for the specific gas; preventing a contact between the facilitated transport membrane and the specific gas; and lastly sealing the packaging body.

[9] A facilitated transport membrane package, including: a packaging body; and a facilitated transport membrane enclosed in the packaging body, the facilitated transport membrane selectively allowing a specific gas to permeate therethrough, the packaging body having a transmission rate of not more than 10,000 cm$^3$/(m$^2$·24 h·atm) for the specific gas, and the facilitated transport membrane and the specific gas being prevented from coming into contact with each other.

Advantageous Effects of Invention

An embodiment of the present invention can advantageously provide a method for packing a facilitated transport membrane, which method makes it possible to prevent quality deterioration of the facilitated transport membrane for a long period of time during storage and transportation of the facilitated transport membrane.

Further, other embodiments of the present invention can advantageously provide a facilitated transport membrane package which is capable of preventing quality deterioration of the facilitated transport membrane for a long period of time, and a method for producing the facilitated transport membrane package.

DESCRIPTION OF EMBODIMENTS

Figure 1:
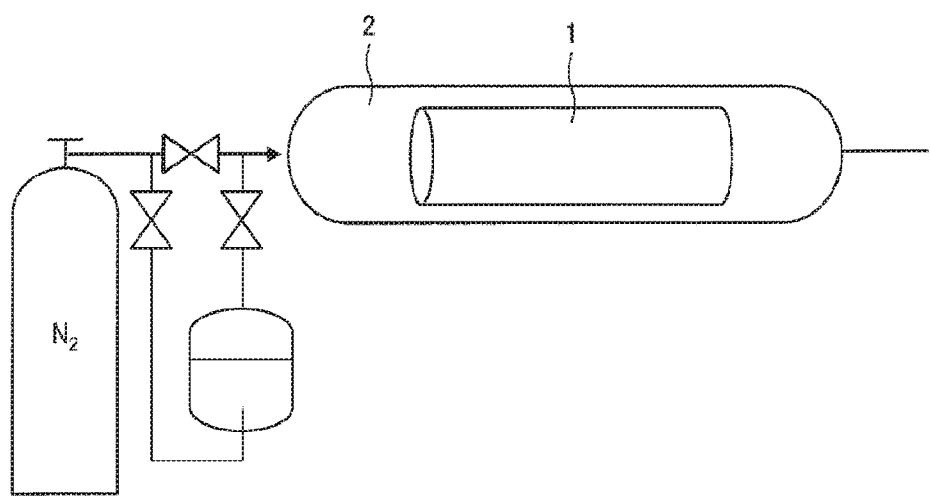
FIG. 1 is an elevational view schematically illustrating a configuration of a device for introducing an inert gas into a packaging body in which a facilitated transport membrane is put.

The following description will discuss embodiments of the present invention in detail. The present invention is not limited to such embodiments, but may be altered in various ways by a skilled person within the scope described in the present application. Any embodiment based on a proper combination of technical means disclosed in different embodiments is also encompassed in the technical scope of the present invention. Note that numerical expressions such as "A to B" herein mean "not less than A and not more than B" unless otherwise stated.

[Facilitated Transport Membrane]

A facilitated transport membrane in accordance with an embodiment of the present invention is a membrane which selectively allows a specific gas to permeate through the facilitated transport membrane. Such a facilitated transport membrane encompasses a publicly known facilitated transport membrane. Therefore, a method for packing the facilitated transport membrane is applied to publicly known facilitated transport membranes. Note that as described later, the facilitated transport membrane preferably contains a hydrophilic resin as a separation membrane resin. Accordingly, the "specific gas" in the present description excludes water vapor though a general facilitated transport membrane allows water vapor to permeate therethrough.

The specific gas which the facilitated transport membrane selectively allows to permeate therethrough is not particularly limited, and for example, can be an acid gas. Examples of the acid gas encompass gases having the property of an acid, such as carbon dioxide or gasified carbonic acid ($CO_2$), a sulfur oxide ($SO_x$), a nitrogen oxide ($NO_x$), and hydrogen sulfide ($H_2S$).

The facilitated transport membrane typically includes at least (a) a separation functional layer containing a separation membrane resin and a carrier which reversibly reacts with a specific gas and (b) a support layer made of a porous membrane which supports the separation functional layer.

The separation membrane resin is not limited to a particular resin, provided that the carrier functions, while being retained, and that the separation membrane resin has a high barrier property against gases except for the specific gas. The separation membrane resin is preferably a hydrophilic resin containing a hydrophilic group such as a hydroxyl group or an ion exchange group, and more preferably a crosslinked hydrophilic resin in which molecular chains of the hydrophilic resin are crosslinked to one another to provide a network structure for a high water-holding capacity. The hydrophilic resin includes, for example, a polymer that preferably contains a structural unit derived from alkyl acrylate ester, alkyl methacrylate ester, vinyl ester of fatty acid, or a derivative of any of the above. Further, the crosslinked hydrophilic resin can be prepared by reacting a hydrophilic polymer with a crosslinking agent or by copolymerizing a monomer as a raw material of a hydrophilic polymer with a crosslinkable monomer. The crosslinking agent and the crosslinkable monomer are not limited to any particular kinds, and can be conventionally publicly known crosslinking agent and crosslinkable monomer. Specific examples of the separation membrane resin encompass a vinyl alcohol-acrylate copolymer (disclosed in, for example, Japan Patent No. 2086581), polyvinyl alcohol (disclosed in, for example, Japanese Patent Application Publication, Tokukai, No. 2011-161387), and crosslinked polyacrylic acid (disclosed in, for example, PCT International Publication No. WO 2016/024523).

Further, the carrier is retained in the separation functional layer, which contains the separation membrane resin. The carrier reversibly reacts with the specific gas dissolved in a medium present in the separation functional layer and thereby functions to selectively allow the specific gas to permeate through the separation functional layer. In a case where the specific gas is an acid gas, the carrier which reversibly reacts with the acid gas includes at least one compound which reversibly reacts with the acid gas (hereinafter, referred to as "acid gas carrier"). Specific examples of the acid gas carrier encompass: alkali metal carbonate, alkali metal bicarbonate, alkanolamine (disclosed in, for example, Japan Patent No. 2086581), alkali metal hydroxide (disclosed in, for example, PCT International Publication No. WO 2016/024523), and the like in a case where the acid gas is carbon dioxide; a sulfur-containing compound, alkali metal citrate, a transition metal complex (disclosed in, for example, Japan Patent No. 2879057), and the like in a case where the acid gas is sulfur oxide; and alkali metal nitrite, a transition metal complex (disclosed in, for example, Japan Patent No. 2879057), and the like in a case where the acid gas is nitrogen oxide.

Note that even in a case where the acid gas to be separated is hydrogen sulfide, the acid gas carrier in the case where the acid gas is carbon dioxide can function so as to selectively allow hydrogen sulfide to permeate through the separation functional layer.

The separation functional layer in the facilitated transport membrane can further contain, for example, a hydration reaction catalyst and/or a surface active agent in addition to the separation membrane resin and the carrier which reversibly reacts with the specific gas. The hydration reaction catalyst increases a rate of reaction between the specific gas and the carrier. Further, in a case where a hydrophobic porous membrane is used as a support for the facilitated transport membrane, the surface active agent improves a membrane-forming property of the separation functional layer which is to be formed on the hydrophobic porous membrane.

The support layer provided in the facilitated transport membrane is not limited to a particular layer, provided that (i) the support layer has a high gas permeability and therefore does not become a large resistance against diffusion of the specific gas and (ii) the support layer is capable of supporting the separation functional layer. The support layer is preferably a hydrophobic porous membrane. It is possible to prevent moisture in the separation functional layer from entering pores of the support layer, by forming the facilitated transport membrane such that the separation functional layer is placed in contact with one surface of the support layer made of such a porous membrane. This makes it possible to prevent deterioration in performance of the facilitated transport membrane. The support layer can be made of, for example, a resin material (e.g., a polyolefin-based resin such as polyethylene or polypropylene, a fluorine-containing resin such as polytetrafluoroethylene (PTFE), polyvinyl fluoride, or polyvinylidene fluoride, polyphenylene sulfide, polyether sulfone, polyimide, high-molecular-weight polyester, heat-resistant polyamide, aramid or polycarbonate) or an inorganic material (e.g., metal, glass, or ceramics). Among these materials, the support layer is preferably made of a fluorine-containing resin such as PTFE, polyvinyl fluoride, or polyvinylidene fluoride, polyphenylene sulfide, polyether sulfone, polyimide, or ceramics. More preferably, the support layer is made of PTFE, because the support layer made of PTFE achieves a better energy efficiency for separation since (i) minute pores can be easily formed in the support layer made of PTFE and (ii) the support layer made of PTFE can have a high porosity.

The facilitated transport membrane has a thickness which is selected as appropriate depending on a necessary permeation and separation capability and a necessary strength. The facilitated transport membrane has a thickness of preferably 10 μm to 4,000 μm, more preferably 10 μm to 1,000 μm, and still more preferably 15 μm to 400 μm. The thickness of the facilitated transport membrane is preferably in the above ranges, since the facilitated transport membrane having such a thickness can achieve a high permeation selectivity and a high strength. In a case where the facilitated transport membrane is thin, the facilitated transport membrane is likely to be weaker and to be broken.

The facilitated transport membrane has an equilibrium moisture content of preferably 1% to 80%, more preferably 20% to 65%, and still more preferably 20% to 50%, at 23° C. The equilibrium moisture content of the facilitated transport membrane is preferably in the above ranges at 23° C., since it becomes possible to prevent quality deterioration of the facilitated transport membrane for a long period of time.

When the facilitated transport membrane is stored or transported, the form of the facilitated transport membrane is not limited to an aspect of the facilitated transport membrane being used, and can be, for example, a publicly known form such as (i) the form of a facilitated transport membrane element which is an accumulation of the facilitated transport membrane, or (ii) the form of a facilitated transport membrane roll which is obtained by winding a sheet of the facilitated transport membrane prior to assembling the facilitated transport membrane into the facilitated transport membrane element.

The facilitated transport membrane roll is, for example, a roll which is formed by winding, on a winding core, the sheet of the facilitated transport membrane. The winding core can be made of a material such as resin, wood, metal or paper, but the material of the winding core is not particularly limited.

The facilitated transport membrane element is obtained by placing hollow-shaped facilitated transport membranes or sheet-shaped facilitated transport membranes on top of each other, and is put in a housing and used when a specific gas is to be separated from a mixed gas containing the specific gas. Examples of types of the facilitated transport membrane element include a plate-and-frame type, a tubular type, a hollow-fiber type, a pleated type and a spiral-wound type. For example, a spiral-wound type facilitated transport membrane element includes: (i) a wound body including a facilitated transport membrane, a feed-side spacer component, and a permeate-side spacer component that are wound in a laminated state around a core tube having holes, which facilitated transport membrane includes (a) a separation functional layer that includes a separation membrane resin and a carrier reversibly reacting with a specific gas, and (b) a support layer made of a porous membrane; and (ii) a sealing section configured to prevent mixing of a feed gas (feed-side fluid) containing the specific gas and the specific gas (permeate-side fluid) having permeated through the facilitated transport membrane. Further, the spiral-wound type facilitated transport membrane element may include a protective layer between the facilitated transport membrane and the feed-side spacer component, and further include a reinforcement porous membrane between the facilitated transport membrane and the permeate-side spacer component.

[Method for Producing Facilitated Transport Membrane and Method for Producing Facilitated Transport Membrane Element]

A method for producing the facilitated transport membrane is not limited to a particular method, and can be, for example, a publicly known production method including the following three steps: a first step (coating solution preparing step), a second step (applying step), and a third step (drying step). The second step and the third step each preferably use roll-to-roll coater and dryer, which carry out the second step and the third step while continuously transferring the support layer. The three steps are briefly described below.

First, in the first step (coating solution preparing step), at least a separation membrane resin and a carrier which reversibly reacts with a specific gas are dissolved in a medium, so that a coating solution is prepared. The coating solution can additionally contain a surface active agent as necessary.

Examples of the medium encompass (i) protic polar media such as water and alcohols including methanol, ethanol, 1-propanol, 2-propanol, and the like, (ii) nonpolar media such as toluene, xylene, and hexane, (iii) ketones such as acetone, methyl ethyl ketone, and methyl isobutyl ketone, (iv) aprotic polar media such as N-methylpyrrolidone, N,N-dimethylacetamide, and N,N-dimethylformamide. These media can be used individually, or a mixture of two or more of these media in combination can be used, provided that the two or more of the media are homogeneously mixed. Among these media, it is preferable to use a medium containing at least one selected from water and alcohols, more preferable to use a media containing water, and particularly preferable to use water.

Next, in the second step (applying step), the coating solution prepared is applied, by a publicly known method, to a surface of the support layer to form a coating. Examples of the publicly known method encompass spin coating, bar coating, die coating, blade coating, air-knife coating, gravure coating, roll coating, spray coating, dip coating, a Comma roll method, a kiss coater method, screen printing, and inkjet printing. The coating solution is applied in a weight per unit area (solid content per unit area) preferably within a range of 1 $g/m^2$ to 1000 $g/m^2$, more preferably within a range of 5 $g/m^2$ to 750 $g/m^2$, and even more preferably within a range of 10 $g/m^2$ to 500 $g/m^2$. The weight per unit area can be controlled by regulating, for example, the speed of forming the coating (for example, the speed of transferring the support layer), the concentration of the coating solution, and/or the discharge amount of the coating solution. The coating solution can be applied to the support layer in a stripe pattern or a dot pattern.

Then, in the third step (drying step), the medium is removed from the coating formed. The medium can be removed by any method, and can be removed by a publicly known method. The medium is, however, preferably removed by a method in which the coating is dried by subjecting the coating to, for example, flowing heated air so that the medium is caused to evaporate for removal. A specific example of the method is a method in which (i) an applied product (that is, the support layer on which a coating has been formed) is put into an air blowing drying furnace adjusted to have a predetermined temperature and a predetermined humidity and (ii) the medium is caused to evaporate from the coating for removal. The coating can be dried at a temperature set as appropriate depending on (i) a kind of medium for the coating solution and (ii) a kind of porous membrane included in the support layer. Typically, the temperature for drying is preferably higher than the freezing point of the medium and lower than the melting point of the porous membrane. Normally, a suitable drying temperature falls within a range of 80° C. to 200° C.

The separation functional layer has a thickness selected as appropriate depending on the separation capability necessary for the facilitated transport membrane. Typically, however, the thickness falls preferably within a range of 0.1 μm to 600 μm, more preferably within a range of 0.5 μm to 400 μm, and particularly preferably within a range of 1 μm to 200 μm.

In a case where the facilitated transport membrane is assembled into a facilitated transport membrane element of, for example, a plate-and-frame type, a tubular type, a hollow-fiber type, a pleated type, or a spiral-wound type, a method for producing such a facilitated transport membrane element is not limited to any particular method and can be a publicly known production method.

One example of the method for producing, for example, a spiral-wound type facilitated transport membrane element includes a method including the following procedures.

First, a lengthwise end of a long permeate-side spacer component is bonded to the outer wall of a core tube having a plurality of holes. Further, a plurality of membrane leaves are prepared in each of which a long facilitated transport membrane is folded into two parts with a long feed-side spacer component between the two parts. Next, a membrane leaf is placed on the permeate-side spacer component bonded to the outer wall of the core tube. Subsequently, a second permeate-side spacer component and a second membrane leaf are placed on an exposed surface (which is opposite to the permeate-side spacer component) of the membrane leaf in this order so as to be attached on top of each other. At this time, an adhesive or the like is provided for sealing at three edge sides, except for one edge side which is closer to the core tube than the three edge sides, of the second permeate-side spacer component sandwiched between the above two membrane leaves.

Similarly, a third permeate-side spacer component and a third membrane leaf are placed on an exposed surface of the second membrane leaf in this order, and an adhesive or the like is provided for sealing at three edge sides of the third permeate-side spacer component. In this way, the membrane leaf etc. is repeatedly placed, so that a laminate including a predetermined number of membrane leaves etc. is formed.

Thereafter, an adhesive is applied to three edge sides, except for one edge side which is the closer to the core tube than the three edge sides, of a membrane leaf which has been placed in the last place. Then, the laminate thus obtained is wound around the core tube such that all the plurality of holes of the outer wall of the core tube are covered by the laminate, and thereby, a wound body including a plurality of sheets of the facilitated transport membrane is formed. As a result, the spiral-wound type facilitated transport membrane element is produced.

[Packaging Body]

A packaging body in accordance with an embodiment of the present invention has a transmission rate of not more than 10,000 $cm^3/(m^2 \cdot 24 \ h \cdot atm)$ for a gas which the facilitated transport membrane selectively allows to permeate therethrough.

The packaging body in accordance with an embodiment of the present invention is not particularly limited in material, shape, etc., provided that the packaging body has a transmission rate of not more than 10,000 $cm^3/(m^2 \cdot 24 \ h \cdot atm)$ for the gas which the facilitated transport membrane selectively allows to permeate therethrough. For example, the packaging body in accordance with an embodiment of the present invention can be made of a film of thermoplastic resin, paper, metal, or the like. The film can be a single-layer film including only one kind of the above materials or a composite film including two or more kinds of the above materials.

Examples of the above thermoplastic resin encompass polyethylene, polypropylene, polyester, and nylon.

Examples of the above metal encompass aluminum, nickel, copper, and chrome. The packaging body can be formed with the use of a film containing only one kind of the above metals or a film made of a mixture or alloy of the above metals. The packaging body also can be a laminate of membranes made of the above metals.

Further, in order to (i) decrease a water vapor transmission rate of the film, (ii) improve impact strength of the film, and/or (iii) protect the film from light, a metal film can be provided on a surface of a film containing a thermoplastic resin. The above metal constituting the metal film is not limited to a particular kind, and can be, for example, aluminum, nickel, copper or chrome.

The metal film on the surface of the film containing a thermoplastic resin can be formed by, for example, a vacuum vapor deposition method, a sputtering method or an ion plating method.

The packaging body in accordance with an embodiment of the present invention has a transmission rate of not more than 10,000 cm$^3$/(m$^2$·24 h·atm), preferably not more than 9,000 cm$^3$/(m$^2$·24 h·atm), and more preferably not more than 3,000 cm$^3$/(m$^2$·24 h·atm), for a specific gas which the facilitated transport membrane selectively allows to permeate therethrough. In a case where the packaging body has a low transmission rate for the specific gas, it is possible to prevent quality deterioration of a facilitated transport membrane for a long period of time by the method in accordance with an embodiment of the present invention. Note that the expression "preventing a contact between the facilitated transport membrane and the specific gas" refers to not only a case where a contact between the facilitated transport membrane and the specific gas is completely blocked, but also a case where a contact between the facilitated transport membrane and the specific gas is reduced (suppressed) as compared to a case where the facilitated transport membrane is not enclosed in the packaging body. Therefore, in the present description, "preventing a contact" refers to "(i) blocking a contact between the facilitated transport membrane and the specific gas or (ii) reducing a contact between the facilitated transport membrane and the specific gas".

The transmission rate of the packaging body for the specific gas can be measured by a method described later in Examples, and therefore a description on the method for measuring the transmission rate is omitted here. Note that though Examples have a description on how the transmission rate of the specific gas is measured in a case where $CO_2$ is used as the specific gas, the transmission rate can be similarly measured even in a case where the specific gas is another kind of gas (e.g., hydrogen sulfide ($H_2S$)).

The water vapor transmission rate of the packaging body in accordance with an embodiment of the present invention is not particularly limited. The water vapor transmission rate is preferably not more than 2 g/(m$^2$·24 h), and more preferably not more than 1.5 g/(m$^2$·24 h). In a case where the water vapor transmission rate of the packaging body is low, it is possible to more suitably prevent (i) an increase/decrease in amount of water vapor inside the packaging body and (ii) development of microorganisms. Note that the water vapor transmission rate of the packaging body can be measured by a method described later in Examples, and therefore a description on the method for measuring the water vapor transmission rate is omitted here.

The packaging body can include, according to need, a seal member or tight seal member for tightly sealing the packaging body, a protective member including, for example, a shock-absorbing material and a packaging material each for protecting the facilitated transport membrane, a light-shielding member for blocking light, and a handle for carrying the packaging body, in addition to the film.

The packaging body is not particularly limited in thickness, provided that the packaging body in which the facilitated transport membrane is enclosed can have a sufficient strength. The thickness of the packaging body is preferably 20 μm to 6,000 μm, more preferably 40 μm to 4,000 μm, and still more preferably 40 μm to 2,000 μm.

The packaging body is not particularly limited in shape, provided that the facilitated transport membrane can be enclosed in the packaging body. Specifically, the packaging body can have, for example, a cylinder shape, a polygonal column shape, or an envelope shape.

[Method for Packing Facilitated Transport Membrane]

A method for packing the facilitated transport membrane in accordance with an embodiment of the present invention (also referred to as a "packing method in accordance with an embodiment of the present invention") is a method for a packing a facilitated transport membrane selectively allowing a specific gas to permeate therethrough, the method including the steps of: putting the facilitated transport membrane in a packaging body having a transmission rate of not more than 10,000 cm$^3$/(m$^2$·24 h·atm) for the specific gas; preventing a contact between the facilitated transport membrane and the specific gas; and lastly sealing the packaging body. The facilitated transport membrane in the packing method in accordance with an embodiment of the present invention can be not only in the form of the facilitated transport membrane as it is, but also in the form of a facilitated transport membrane roll obtained by winding a sheet of the facilitated transport membrane or the form of a facilitated transport membrane element which is an accumulation of the facilitated transport membrane.

In the packing method in accordance with an embodiment of the present invention, the step of preventing a contact between the facilitated transport membrane and the specific gas can be the step of blocking a contact between the facilitated transport membrane and the specific gas or the step of reducing a contact between the facilitated transport membrane and the specific gas. Examples of the step of preventing a contact between the facilitated transport membrane and the specific gas encompass: the step of replacing, by an inert gas, a gas inside the packaging body in which the facilitated transport membrane is put (the step of filling a gas phase inside the packaging body with an inert gas such that no other gas like air is contained inside the packaging body); and the step of introducing an inert gas into the packaging body in which the facilitated transport membrane is put (the step of introducing a lot of inert gas into the gas phase inside the packaging body while allowing other gas like air to be present in the gas phase inside the packaging body). In a process for achieving "the step of introducing an inert gas into the packaging body in which the facilitated transport membrane is put", preferably, part or the whole of gas like air which has been originally present inside the packaging body can be replaced by the inert gas. In this case, "the step of introducing an inert gas into the packaging body in which the facilitated transport membrane is put" becomes "the step of replacing, by the inert gas, part or the whole of gas inside the packaging body in which the facilitated transport membrane is put". Note that the "other gas" refers to a gas which is different from the inert gas which is introduced into the packaging body, and to a gas which occupies a gas phase portion inside the packaging body before the packaging body is used, that is, before the facilitated transport membrane is put in the packaging body and/or the inert gas is introduced into the packaging body. An example of the "other gas" is air. The volume ratio (%) of the inert gas with respect to the gas inside the packaging body at the time point when the packaging body is sealed is preferably not less than 50% by volume, more preferably not less than 75% by volume, still more preferably not less than 90% by volume, particularly preferably not less than 95% by volume, and most preferably not less than 99% by volume.

The step of introducing an inert gas into the packaging body can be carried out prior to or after the step of putting the facilitated transport membrane in the packaging body. It is preferable to carry out the step of introducing an inert gas into the packaging body after the step of putting the facilitated transport membrane in the packaging body.

The packing method in accordance with an embodiment of the present invention preferably includes the step of adjusting a ratio of the volume of the facilitated transport membrane with respect to the volume of gas inside the packaging body at the time point when the packaging body is sealed, within a range of not less than 0.1 and not more than 10,000. This volume ratio is preferably in a range of not less than 0.1 and not more than 10,000, more preferably in a range of not less than 0.1 and not more than 200, and still more preferably in a range of not less than 0.1 and not more than 100. In a case where the volume ratio is in the above preferable range, it is possible to more suitably prevent quality deterioration of the facilitated transport membrane for a long period of time. In a case where the above volume ratio is too small, a change in temperature inside the packaging body may cause condensation of water vapor or the like and liquid droplets may be produced. This is likely to lead to a defect in the facilitated transport membrane. In contrast, in a case where the volume ratio is too large, it probably becomes impossible to efficiently enclose the facilitated transport membrane in the packaging body.

FIG. 1 is an elevational view schematically illustrating a configuration of a device for introducing an inert gas into a packaging body in which a facilitated transport membrane is put. As illustrated in FIG. 1, the volume of gas inside the packaging body is a gas-phase capacity (volume) which is obtained by subtracting the volume of the facilitated transport membrane 1 from a capacity inside packaging body 2 at the time point when the packaging body is sealed. For example, in a case where the volume of the facilitated transport membrane 1 is 0.000315 $m^3$ and the gas phase capacity, which is obtained by subtracting the volume of the facilitated transport membrane 1 from the capacity inside the packaging body 2, is 0.03 $m^3$, the volume ratio is 95.

In the packing method in accordance with an embodiment of the present invention, the step of sealing the packaging body is carried out after the step of putting the facilitated transport membrane in the packaging body and the step of preventing a contact between the facilitated transport membrane and the specific gas. Specifically, the step of sealing the packaging body can be carried out by sealing an opening of the packaging body through which opening the facilitated transport membrane and the like is put into the packaging body. The opening of the packaging body can be sealed by any method, provided that it is possible to seal the opening to an extent that can prevent the specific gas from flowing into the packaging body through the opening. It is preferable that such a method allows the packaging body to be tightly sealed so that the specific gas can be further prevented from flowing into the packaging body. In the packing method in accordance with an embodiment of the present invention, the opening of the packaging body can be sealed, for example, (i) by tightly sealing the packaging body by heat-sealing, (ii) by tightly sealing the packaging body with the use of a fastening band, a metal such as a wire, a rubber band, or the like, or (iii) by bending or twisting the packaging body at the opening. In order to allow the opening of the packaging body to be sufficiently tightly sealed, it is preferable to seal the opening of the packaging body by heat-sealing. Note that after the packaging body is sealed, the exterior of the packaging body can be packed with a protective member such as a shock-absorbing material or a packaging material. This makes it possible to prevent damage by an external impact to the facilitated transport membrane.

The packing method in accordance with an embodiment of the present invention only needs to make it possible to prevent a contact between the facilitated transport membrane and the specific gas as described above, but it is more preferable that the packing method make it possible to prevent water vapor from flowing between the inside and the outside of the packaging body. This makes it possible to keep the amount of water vapor inside the packaging body in a preferable range, and further makes it possible to keep the facilitated transport membrane in a suitable state.

The packing method in accordance with an embodiment of the present invention preferably further includes the step of adjusting a humidity of gas inside the packaging body. The humidity of gas inside the packaging body is not particularly limited. The humidity is adjusted such that, for example, a relative humidity at 23° C. at the time point when the packaging body is sealed is preferably in a range of not lower than 30% RH and not higher than 90% RH, more preferably in a range of not lower than 30% RH and not higher than 80% RH, and still more preferably not lower than 30% RH and not higher than 70% RH. In a case where the humidity of gas inside the packaging body is in the above preferable range, it is possible to more suitably prevent excessive drying or swelling of the facilitated transport membrane and development of microorganisms. In a case where the humidity of gas inside the packaging body is too low, the facilitated transport membrane is likely to dry and result in quality deterioration. In contrast, in a case where the humidity of gas inside the packaging body is too high, a change in temperature inside the packaging body may cause condensation of water vapor or the like and liquid droplets may be produced. This is likely to lead to a defect in the facilitated transport membrane. In addition, this may lead to development of microorganisms.

The step of adjusting a humidity of gas inside the packaging body is carried out, according to need, more preferably by adjusting a moisture content of the facilitated transport membrane before putting the facilitated transport membrane in the packaging body or by introducing a humidity-adjusted inert gas in the packaging body.

The moisture content of the facilitated transport membrane before putting the facilitated transport membrane in the packaging body can be adjusted by any method. The moisture content of the facilitated transport membrane can be adjusted by, for example, (i) humidity adjustment of the facilitated transport membrane by putting the facilitated transport membrane in a thermo-hygrostat bath in which the temperature and the humidity are adjusted to suitable temperature and humidity, or (ii) carrying out, for an appropriate time period, (a) continuous feeding of the inert gas having an adjusted humidity to the facilitated transport membrane contained in a housing, through a gas inlet of the housing, and (b) continuous discharging of gas inside the housing from a gas outlet of the housing.

Meanwhile, the humidity of the inert gas can be controlled by any method. The humidity can be controlled, for example, by (i) using a drying agent, (ii) bubbling with the inert gas in water, or (iii) mixing water vapor with the inter gas.

Note that it is possible to contain, in the packaging body, for example, a drying agent, a heat storage material, a humidity adjusting material, and/or a deoxidizer as necessary, together with the facilitated transport membrane.

The "inert gas" in the packing method in accordance with an embodiment of the present invention refers to a gas which does not have any adverse effect on performance of the facilitated transport membrane. Examples of the "inert gas" encompass $N_2$ gas, and noble gases such as helium and argon. In view of cost, handleability, etc., the inert gas is preferably $N_2$ gas in the packing method in accordance with an embodiment of the present invention.

The specific gas is not particularly limited in initial concentration inside the packaging body. The initial concentration of the specific gas inside the packaging body is preferably 0 ppm to 400 ppm, more preferably 0 ppm to 20 ppm, and still more preferably 0 ppm to 1 ppm. In a case where the initial concentration of the specific gas inside the packaging body is low, it is possible to prevent quality deterioration of the facilitated transport membrane for a long period of time. The initial concentration of the specific gas is a concentration of the specific gas which concentration is measured after the inert gas is introduced into the packaging body and immediately before the packaging body is sealed.

There is no particular limitation to (i) a temperature inside the packaging body which has been sealed by the packing method in accordance with an embodiment of the present invention and (ii) a temperature at which the packaging body is stored, provided that these temperatures do not cause quality deterioration of the facilitated transport membrane. These temperatures are each preferably 0° C. to 40° C., more preferably 15° C. to 35° C., and still more preferably 20° C. to 30° C. In a case where the temperature inside the packaging body and the temperature at which the packaging body is stored are in the above ranges, it is possible to more suitably prevent quality deterioration of the facilitated transport membrane for a long period of time.

The atmospheric pressure of an atmosphere in which the packaging body is stored is not limited to a particular atmospheric pressure, provided that the atmospheric pressure does not cause quality deterioration of the facilitated transport membrane. The atmospheric pressure is preferably in a range of 78 kPa to 110 kPa. In a case where the atmospheric pressure of the atmosphere in which the packaging body is stored is in the above range, it is possible to more suitably prevent quality deterioration of the facilitated transport membrane for a long period of time.

[Facilitated Transport Membrane Package, and Method for Producing Facilitated Transport Membrane Package]

A facilitated transport membrane package in accordance with an embodiment of the present invention is a facilitated transport membrane package which includes: a packaging body; and a facilitated transport membrane enclosed in the packaging body, which facilitated transport membrane selectively allows a specific gas to permeate therethrough. In the facilitated transport membrane package, the packaging body has a transmission rate of not more than 10,000 $cm^3/(m^2 \cdot 24 \ h \cdot atm)$ for the specific gas and a contact between the facilitated transport membrane and the inert gas is prevented. In other words, the facilitated transport membrane package in accordance with an embodiment of the present invention can be obtained by enclosing the facilitated transport membrane in the packaging body through the packing method in accordance with an embodiment of the present invention. Accordingly, the description on the packing method in accordance with an embodiment of the present invention in the preceding section of the present description can be referred to, as appropriate, for description of, for example, the facilitated transport membrane package in accordance with an embodiment of the present invention and a method for producing the facilitated transport membrane package and a method for storing the facilitated transport membrane package.

The facilitated transport membrane package in accordance with an embodiment of the present invention can be suitably used, for example, in storage and transportation of the facilitated transport membrane which will be used in a process of separating an acid gas such as carbon dioxide ($CO_2$) etc. from a mixed gas (e.g., a synthetic gas, a natural gas, or an exhaust gas) which contains at least the acid gas as a gas which the facilitated transport membrane selectively allows to permeate therethrough. When the facilitated transport membrane is to be used, the packaging body is opened and the facilitated transport membrane is taken out. Then, the facilitated transport membrane is used.

EXAMPLES

[Method for Producing Facilitated Transport Membrane]

Into a reactor, 188 g of water, 4 g of crosslinked polyacrylic acid (manufactured by Sumitomo Seika Chemicals Co., Ltd., "AQUPEC HV-501"), 0.8 g of non-crosslinked polyacrylic acid (manufactured by Sumitomo Seika Chemicals Co., Ltd., "AQUPAANA AP-40F", 40% Na-saponified), and 10.5 g of cesium hydroxide monohydrate were introduced. Then, while a resultant mixture was being stirred, a neutralization reaction was carried out (neutralizing step). After completion of the neutralization reaction, 10 g of cesium carbonate, 1.5 g of sodium tellurite, and 1.2 g of a surface active agent (manufactured by AGC Seimi Chemical Co., Ltd., "SURFLON S-242") were added and mixed in the mixture neutralized, so that a coating solution I was obtained.

Next, the coating solution I obtained above was applied to a surface of a hydrophobic PTFE porous membrane (manufactured by Sumitomo Electric Fine Polymer, Inc., "POREFLON HP-010-50", thickness: 50 μm, pore size: 0.1 μm). Thereafter, the hydrophobic PTFE porous membrane to which the coating solution had been applied was dried at a temperature of approximately 120° C. for approximately 5 minutes. This prepared a $CO_2$ separation membrane including a $CO_2$ separation functional layer on the hydrophobic PTFE porous membrane.

In Examples and Comparative Examples below, the $CO_2$ separation membrane was used as a facilitated transport membrane.

[Methods for Measuring Physical Property Values]

(a) Flat Membrane $N_2$ Leak Test

Figure 2:
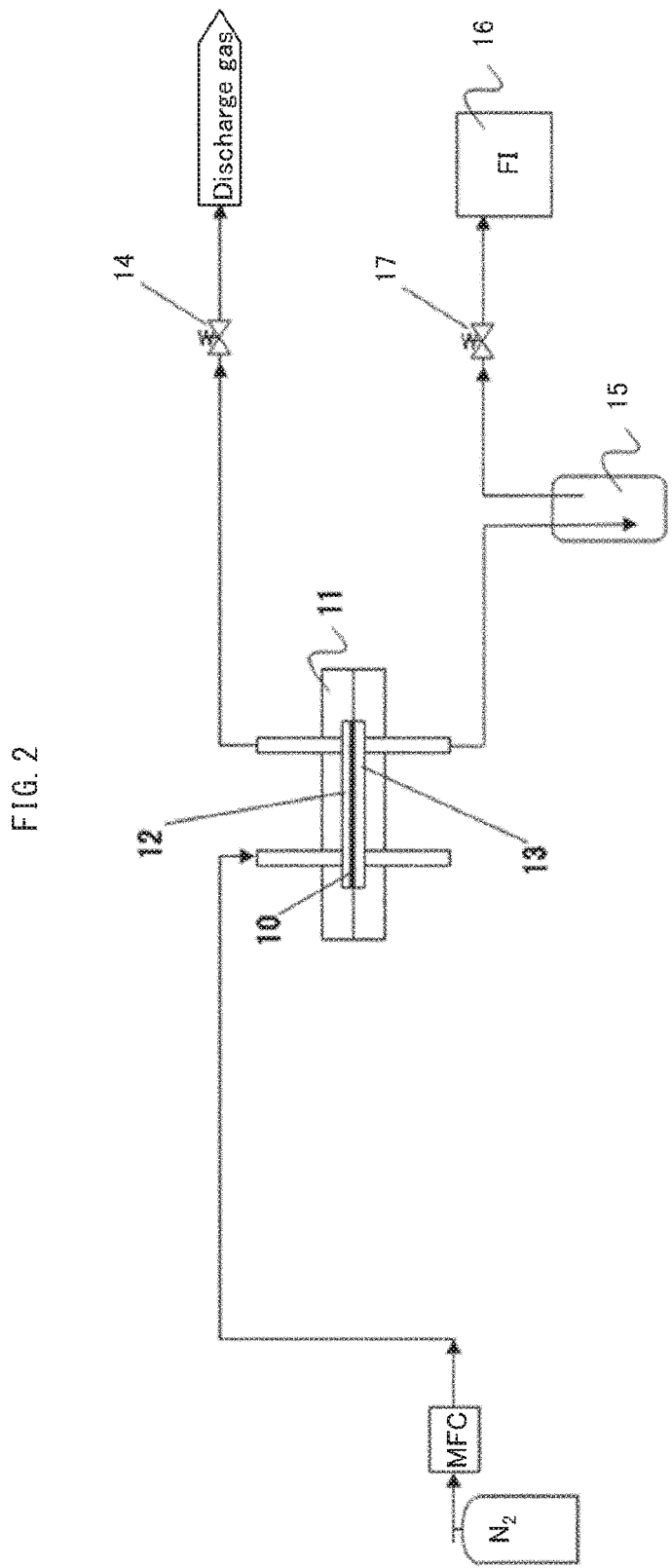
FIG. 2 is an elevational view schematically illustrating a configuration of a measuring device for use in a flat membrane N$_2$ leak test of a sheet (flat membrane) of a facilitated transport membrane in Examples and Comparative Examples.

FIG. 2 is an elevational view schematically illustrating a configuration of a measuring device for use in a flat membrane $N_2$ leak test of a sheet (flat membrane) of the facilitated transport membrane in Examples and Comparative Examples. As illustrated in FIG. 2, the flat membrane $N_2$ leak test of a $CO_2$ separation membrane was carried out as below with the use of a measuring device including one separation membrane module (facilitated transport membrane module) 11.

First, the $CO_2$ separation membrane 10 was cut, so that a 50 mmφ piece of the $CO_2$ separation membrane 10 was obtained. Then, this piece was fixed between a feed-side chamber 12 and a permeation-side chamber 13 of a stainless-steel flow type gas permeation cell. As a result, the $CO_2$ separation membrane module 11 was prepared. Further, the feed-side chamber 12 was connected with an $N_2$ gas inlet and an $N_2$ gas outlet. Then, $N_2$ gas (purity of 100%) was fed to the $CO_2$ separation membrane module 11 through the $N_2$ gas inlet of the feed-side chamber 12. The feed-side chamber 12 had a pressure which had been adjusted to 900 kPa by a back pressure regulator 14. The back pressure regulator was provided in a discharge channel for discharge gas which was discharged through the $N_2$ gas outlet of the feed-side chamber 12. Further, the permeation-side chamber 13 had a pressure which had been adjusted to an atmospheric pressure by a back pressure regulator 17, which was provided in a discharge channel for permeation gas which had permeated through the membrane and which was discharged through an outlet of the permeation-side chamber 13.

After the $N_2$ gas was retained for 10 minutes from a time point at which the $N_2$ gas was fed to the feed-side chamber 12, a flow rate of the permeation gas, which had been discharged from the permeation-side chamber 13 and from which water vapor had been removed, was measured by a flowmeter 16. Then, a permeance (mol/($m^2 \cdot s \cdot kPa$)) of the $N_2$ gas was calculated. Then, in a case where the permeance (mol/($m^2 \cdot s \cdot kPa$)) of the $N_2$ gas contained in the permeation gas was not less than $1.0 \times 10^{-8}$ after the $N_2$ gas had been retained for 10 minutes from the time point at which the $N_2$ gas was fed to the feed-side chamber 12, the $CO_2$ separation membrane 10 was regarded as having a leak which caused deterioration in selectivity. Because of the occurrence of the leak, it can be considered that quality deterioration of the $CO_2$ separation membrane occurred in 60-day storage with the use of a packaging body.

The above series of operations was carried out 10 times. Then, in a case where no leak occurred 8 or more times out of the 10 times, a result of the flat membrane $N_2$ leak test was evaluated as grade "A", and in a case where no leak occurred less than 8 times out of the ten times, a result of the flat membrane $N_2$ leak test was evaluated as grade "B".

(b) Measurement of the Maximum Number of Days of Storage

In evaluation of measurement of the maximum number of days of storage for which grade "A" evaluation in the flat membrane $N_2$ leak test could be maintained, the following grades were used: grade "a" in a case where the maximum number of days of storage was not less than 100; grade "b" in a case where the maximum number of days of storage was not less than 60 and less than 100; and grade "c" in a case where the maximum number of days of storage was less than 60.

(c) Measurement of $CO_2$ Transmission Rate

Measurement of a $CO_2$ transmission rate of the packaging body was carried out in conformity to "JIS K7126-1 (Pressure Sensor Method)". In this measurement, the following measuring device and measurement conditions were used.

Measuring device: gas permeability measuring device (manufactured by TOYO SEIKI SEISAKU-SHO, LTD, MT-C3)

Testing gas: $CO_2$ gas
Temperature and humidity conditions: temperature: 25° C., humidity: 0%
Packaging body piece: 38 $cm^2$
Testing differential-pressure: 760 mmHg (d) Measurement of Water Vapor Transmission Rate Measurement of a water vapor transmission rate of the packaging body was carried out in conformity to "JIS K7129 (Dish Method)". In this measurement, the following measuring device and measurement conditions were used.

Measuring device: water vapor transmission rate measuring device (manufactured by ESPEC CORPORATION, thermo-hygrostat)

Temperature and humidity conditions: temperature: 25° C., humidity: 90% RH

Example 1

A packaging body I having a size of 10 cm×10 cm was prepared with the use of a composite film (manufactured by SEISANNIPPONSHA Ltd., product name: Lamizip) which is a laminate of a PET membrane (thickness: 12 μm), aluminum foil (thickness: 9 μm), a nylon NY membrane (thickness: 15 μm), and a polyethylene membrane (thickness: 70 μm) which had been provided in this order. The packaging body I had a $CO_2$ transmission rate of 0.7 $cm^3$/($m^2 \cdot 24$ h·atm) and a water vapor transmission rate of 0.01 g/($m^2 \cdot 24$ h).

The $CO_2$ separation membrane obtained by the above production method was cut, so that a 5 cmφ piece of the $CO_2$ separation membrane was obtained. Then, a humidity of this piece of the $CO_2$ separation membrane was adjusted in advance so that after the piece of the $CO_2$ separation membrane was packed, a relative humidity would be 20% RH in an equilibrium state inside the packaging body. Thereafter, the piece of the $CO_2$ separation membrane was put in the packaging body I.

Subsequently, $N_2$ gas was introduced into the packaging body I for a sufficiently long period of time, so that the air inside the packaging body was replaced by the $N_2$ gas. Then, an opening of the packaging body was tightly sealed by a heat sealer (ISHIZAKI ELECTRIC MFG. CO., LTD., product name: SURE NL-402J) such that a ratio of the volume of the $CO_2$ separation membrane to the volume of gas inside the packaging body was 95. The packaging body had an internal temperature of 23° C. which had been measured immediately before the packaging body was tightly sealed.

The packaging body which had been tightly sealed was stored at 23° C. and at a relative humidity of 20% RH under an atmospheric pressure condition for 60 days. Then, the $CO_2$ separation membrane was taken out from the packaging body and subjected to the flat membrane $N_2$ leak test. A result of the flat membrane $N_2$ leak test was evaluated as grade "A". Further, with regard to the maximum number of days of storage, the packaging body was evaluated as grade "b". Tables 1 and 2 sum up and show materials, packing conditions, etc. of the packaging body.

Example 2

A packaging body II having a size of 10 cm×10 cm was prepared with the use of a polyvinylidene fluoride membrane (manufactured by DuPont Kabushiki Kaisha, product name: Tedlar PVF film; thickness: 50, single-layer film). The packaging body II had a $CO_2$ transmission rate of 250 $cm^3$/($m^2 \cdot 24$ h·atm) and a water vapor transmission rate of 0.33 g/($m^2 \cdot 24$ h).

A $CO_2$ separation membrane whose humidity had been adjusted in advance as in Example 1 was put in the packaging body II. Then, the packaging body II was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "A". Table 1 sums up and shows materials, packing conditions, etc. of the packaging body.

Example 3

A packaging body III having a size of 10 cm×10 cm was prepared with the use of a laminated film in which 20 polyethylene membranes (manufactured by SEISANNIPPONSHA Ltd., product name: Unipack, thickness: 40 μm) were stacked on top of one another. The packaging body III had a $CO_2$ transmission rate of 875 $cm^3$/($m^2 \cdot 24$ h·atm) and a water vapor transmission rate of 0.14 g/($m^2 \cdot 24$ h).

A $CO_2$ separation membrane whose humidity had been adjusted in advance as in Example 1 was put in the packaging body III. Then, the packaging body III was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "A". Table 1 sums up and shows materials, packing conditions, etc. of the packaging body.

Example 4

A packaging body IV having a size of 10 cm×10 cm was prepared with the use of a laminated film in which 10 polyethylene membranes (manufactured by SEISANNIPPONSHA Ltd., product name: Unipack, thickness: 40 μm) were stacked on top of one another. The packaging body IV had a $CO_2$ transmission rate of 1750 $cm^3/(m^2 \cdot 24\ h \cdot atm)$ and a water vapor transmission rate of 0.27 $g/(m^2 \cdot 24\ h)$.

A $CO_2$ separation membrane whose humidity had been adjusted in advance as in Example 1 was put in the packaging body IV. Then, the packaging body IV was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "A". Table 1 sums up and shows materials, packing conditions, etc. of the packaging body.

Example 5

A packaging body V having a size of 10 cm×10 cm was prepared with the use of a laminated film in which 5 polyethylene membranes (manufactured by SEISANNIPPONSHA Ltd., product name: Unipack, thickness: 40 μm) were stacked on top of one another. The packaging body V had a $CO_2$ transmission rate of 3500 $cm^3/(m^2 \cdot 24\ h \cdot atm)$ and a water vapor transmission rate of 0.54 $g/(m^2 \cdot 24\ h)$.

A $CO_2$ separation membrane whose humidity had been adjusted in advance as in Example 1 was put in the packaging body V. Then, the packaging body V was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "A". Table 1 sums up and shows materials, packing conditions, etc. of the packaging body.

Example 6

A packaging body VI having a size of 10 cm×10 cm was prepared with the use of a laminated film in which 2 polyethylene membranes (manufactured by SEISANNIPPONSHA Ltd., product name: Unipack, thickness: 40 μm) were stacked on top of each other. The packaging body VI had a $CO_2$ transmission rate of 8750 $cm^3/(m^2 \cdot 24\ h \cdot atm)$ and a water vapor transmission rate of 1.35 $g/(m^2 \cdot 24\ h)$.

A $CO_2$ separation membrane whose humidity had been adjusted in advance as in Example 1 was put in the packaging body VI. Then, the packaging body VI was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "A". Table 1 sums up and shows materials, packing conditions, etc. of the packaging body.

Comparative Example 1

A $CO_2$ separation membrane obtained by the above production method was exposed to atmospheric air, and then stored at 23° C. and at a relative humidity of 30% RH under an atmospheric pressure condition for 60 days. Subsequently, the flat membrane $N_2$ leak test on that $CO_2$ separation membrane was performed. A result of the flat membrane $N_2$ leak test was evaluated as grade "B". Further, with regard to the maximum number of days of storage, the packaging body was evaluated as grade "c". Tables 1 and 2 sum up and show materials, packing conditions, etc. of the packaging body.

Comparative Example 2

A packaging body VII having a size of 10 cm×10 cm was prepared with the use of a polyethylene membrane (manufactured by SEISANNIPPONSHA Ltd., product name: Unipack, thickness: 40 μm, single-layer film). The packaging body VII had a $CO_2$ transmission rate of 17500 $cm^3/(m^2 \cdot 24\ h \cdot atm)$ and a water vapor transmission rate of 2.7 $g/(m^2 \cdot 24\ h)$.

A $CO_2$ separation membrane whose humidity had been adjusted in advance as in Example 1 was put in the packaging body VII. Then, the packaging body VII was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "B". Further, with regard to the maximum number of days of storage, the packaging body was evaluated as grade "c". Tables 1 and 2 sum up and show materials, packing conditions, etc. of the packaging body.

Comparative Example 3

A packaging body VIII having a size of 10 cm×10 cm was prepared with the use of a polyphenylene sulfide membrane (manufactured by Hirose Paper Mfg. Co., Ltd., product name: PPS Paper, thickness: 115 μm, single-layer film). Neither the $CO_2$ transmission rate of the packaging body VIII nor the water vapor transmission rate of the packaging body VIII were measurable (the $CO_2$ transmission rate was not less than 100,000 $cm^3/(m^2 \cdot 24\ h \cdot atm)$ and the water vapor transmission rate was not less than 100,000 $g/(m^2 \cdot 24\ h)$).

A $CO_2$ separation membrane whose humidity had been adjusted in advance as in Example 1 was put in the packaging body VIII. Then, the packaging body VIII was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "B". Further, with regard to the maximum number of days of storage, the packaging body was evaluated as grade "c".

Tables 1 and 2 sum up and show materials, packing conditions, etc. of the packaging body.

Comparative Example 4

A $CO_2$ separation membrane whose humidity had been adjusted in advance as in Example 1 was put in the packaging body I as in Example 1.

Then, $CO_2$ gas was caused to flow into this packaging body for a sufficiently long period of time, so that the air inside the packaging body was replaced by the $CO_2$ gas. Then, the packaging body was tightly sealed as in Example 1.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "B". Table 1 sums up and shows materials, packing conditions, etc. of the packaging body.

Comparative Example 5

A $CO_2$ separation membrane whose humidity had been adjusted in advance as in Example 1 was put in the packaging body I as in Example 1. Then, an opening of the packaging body was tightly sealed such that a ratio of the volume of the $CO_2$ separation membrane to the volume of gas inside the package was 95. In this case, the air inside the packaging body had not been replaced by another gas.

The packaging body which had been tightly sealed was stored for 60 days as in Example 1. Then, the $CO_2$ separation membrane was taken out from the packaging body and subjected to the flat membrane $N_2$ leak test. A result of the flat membrane $N_2$ leak test was evaluated as grade "B". Table 1 sums up and shows materials, packing conditions, etc. of the packaging body.

Example 7

A $CO_2$ separation membrane which had been produced by the above-described production method was put in the packaging body I as in Example 1. The $CO_2$ separation membrane in this case had a humidity which had not been adjusted in advance (the $CO_2$ separation membrane had been exposed to atmospheric air and had a relative humidity of less than 10% RH in an equilibrium state).

Thereafter, $N_2$ gas was caused to flow into the packaging body for a sufficiently long period of time, so that the air inside the packaging body was replaced by the $N_2$ gas. Then, silica gel (drying agent) was added in the packaging body. Further, an opening of the packaging body was tightly sealed such that a ratio of the volume of the $CO_2$ separation membrane to the volume of gas inside the packaging body was 95. In this case, the air inside the packaging body had not been replaced by another gas.

The packaging body which had been tightly sealed was stored for 60 days as in Example 1. Then, the $CO_2$ separation membrane was taken out from the packaging body and subjected to the flat membrane $N_2$ leak test. Subsequently, the maximum number of days of storage was evaluated as grade "b". Table 2 sums up and shows materials, packing conditions, etc. of the packaging body.

Example 8

A $CO_2$ separation membrane, which had been produced by the above-described production method, was put in the packaging body I as in Example 1. The $CO_2$ separation membrane here had a humidity which had not been adjusted in advance. Further, $N_2$ gas was caused to flow into the packaging body for a sufficiently long period of time, so that the air inside the packaging body was replaced by the $N_2$ gas. The $N_2$ gas here was a gas whose humidity had been adjusted so that after the $CO_2$ separation membrane was packed, the relative humidity in an equilibrium state inside the packaging body would be 30% RH. Then, an opening of the packaging body was tightly sealed such that a ratio of the volume of the $CO_2$ separation membrane to the volume of gas inside the packaging body was 95.

The packaging body which had been tightly sealed was stored for 60 days as in Example 1. Then, the $CO_2$ separation membrane was taken out from the packaging body and subjected to the flat membrane $N_2$ leak test. Subsequently, the maximum number of days of storage was evaluated as grade "a". Table 2 sums up and shows materials, packing conditions, etc. of the packaging body.

Example 9

A packaging body which had been tightly sealed was stored for 60 day as in Example 8, except that $N_2$ gas here had a humidity which had been adjusted in advance so that after the $CO_2$ separation membrane was packed, the relative humidity in an equilibrium state inside the packaging body would be 35% RH. Then, the $CO_2$ separation membrane was taken out from the packaging body and subjected to the flat membrane $N_2$ leak test. Subsequently, the maximum number of days of storage was evaluated as grade "a". Table 2 sums up and shows materials, packing conditions, etc. of the packaging body.

Example 10

A packaging body which had been tightly sealed was stored for 60 day as in Example 8, except that $N_2$ gas here had a humidity which had been adjusted in advance so that after the $CO_2$ separation membrane was packed, the relative humidity in an equilibrium state inside the packaging body would be 40% RH. Then, the $CO_2$ separation membrane was taken out from the packaging body and subjected to the flat membrane $N_2$ leak test. Subsequently, the maximum number of days of storage was evaluated as grade "a". Table 2 sums up and shows materials, packing conditions, etc. of the packaging body.

Example 11

A packaging body which had been tightly sealed was stored for 60 day as in Example 8, except that $N_2$ gas here had a humidity which had been adjusted in advance so that after the $CO_2$ separation membrane was packed, the relative humidity in an equilibrium state inside the packaging body would be 50% RH. Then, the $CO_2$ separation membrane was taken out from the packaging body and subjected to the flat membrane $N_2$ leak test. Subsequently, the maximum number of days of storage was evaluated as grade "a". Table 2 sums up and shows materials, packing conditions, etc. of the packaging body.

Example 12

A packaging body which had been tightly sealed was stored for 60 day as in Example 8, except that $N_2$ gas here had a humidity which had been adjusted in advance so that after the $CO_2$ separation membrane was packed, the relative humidity in an equilibrium state inside the packaging body would be 70% RH. Then, the $CO_2$ separation membrane was taken out from the packaging body and subjected to the flat membrane $N_2$ leak test. Subsequently, the maximum number of days of storage was evaluated as grade "a". Table 2 sums up and shows materials, packing conditions, etc. of the packaging body.

TABLE 1

| | | Packaging Body | | | |
|---|---|---|---|---|---|
| | Evaluation of Flat Membrane $N_2$ Leak Test | Kind | Materials and Thicknesses | $CO_2$ Transmission Rate [cm$^3$/(m$^2$ · 24 hr · atm)] | Water vapor Transmission Rate [g/(m$^2$ · 24 hr)] |
| Example 1 | A | composite film | PET 12 μm/ aluminum 9 μm/ nylon NY 15 μm/ polyethylene 70 μm | 0.7 | 0.01 |
| Example 2 | A | single-layer film | polyvinylidene fluoride 50 μm | 250 | 0.33 |
| Example 3 | A | laminated film | polyethylene 800 μm | 875 | 0.14 |
| Example 4 | A | laminated film | polyethylene 400 μm | 1750 | 0.27 |
| Example 5 | A | laminated film | polyethylene 200 μm | 3500 | 0.54 |
| Example 6 | A | laminated film | polyethylene 80 μm | 8750 | 1.35 |
| Comparative Example 1 | B | no film (exposure to atmosphere) | — | — | — |
| Comparative Example 2 | B | single-layer film | polyethylene 40 μm | 17500 | 2.7 |
| Comparative Example 3 | B | single-layer film | polyphenylene sulfide 115 μm | unmeasurable 100000< | unmeasurable 100000< |
| Comparative Example 4 | B | composite film | PET 12 μm/ aluminum 9 μm/ nylon NY 15 μm/ polyethylene 70 μm | 0.7 | 0.01 |
| Comparative Example 5 | B | composite film | PET 12 μm/ aluminum 9 μm/ nylon NY 15 μm/ polyethylene 70 μm | 0.7 | 0.01 |

| | Packing Conditions | | | | | |
|---|---|---|---|---|---|---|
| | Ratio of $CO_2$ Separation Membrane Volume to Gas Volume Inside Packaging Body | Filling Gas | Internal Temperature | Relative Humidity | Humidity Adjustment Method | Storage Environment |
| Example 1 | 95 | $N_2$ | 23° C. | 20% RH | adjust humidity of membrane in advance | atmospheric pressure, 23° C. |
| Example 2 | 95 | $N_2$ | 23° C. | 20% RH | adjust humidity of membrane in advance | atmospheric pressure, 23° C. |
| Example 3 | 95 | $N_2$ | 23° C. | 20% RH | adjust humidity of membrane in advance | atmospheric pressure, 23° C. |
| Example 4 | 95 | $N_2$ | 23° C. | 20% RH | adjust humidity of membrane in advance | atmospheric pressure, 23° C. |
| Example 5 | 95 | $N_2$ | 23° C. | 20% RH | adjust humidity of membrane in advance | atmospheric pressure, 23° C. |
| Example 6 | 95 | $N_2$ | 23° C. | 20% RH | adjust humidity of membrane in advance | atmospheric pressure, 23° C. |
| Comparative Example 1 | — | Air | 23° C. | 30% RH | (exposure to atmosphere) | atmospheric pressure, 23° C. |
| Comparative Example 2 | 95 | $N_2$ | 23° C. | 20% RH | adjust humidity of membrane in advance | atmospheric pressure, 23° C. |
| Comparative Example 3 | 95 | $N_2$ | 23° C. | 20% RH | adjust humidity of membrane in advance | atmospheric pressure, 23° C. |

TABLE 1-continued

| | | | | | | |
|---|---|---|---|---|---|---|
| Comparative Example 4 | 95 | CO₂ | 23° C. | 20% RH | adjust humidity of membrane in advance | atmospheric pressure, 23° C. |
| Comparative Example 5 | 95 | Air | 23° C. | — | adjust humidity of membrane in advance | atmospheric pressure, 23° C. |

TABLE 2

| | Packaging Body | | | | |
|---|---|---|---|---|---|
| | Maximum Number of Days of Storage | Kind | Materials and Thicknesses | CO₂ Transmission Rate [cm³/(m² · 24 hr · atm)] | Water vapor Transmission Rate [g/(m2 · 24 hr)] |
| Example 1 | b | composite film | PET 12 μm/ aluminum 9 μm/ nylon NY 15 μm/ polyethylene 70 μm | 0.7 | 0.01 |
| Example 7 | b | | | | |
| Example 8 | a | | | | |
| Example 9 | a | | | | |
| Example 10 | a | | | | |
| Example 11 | a | | | | |
| Example 12 | a | | | | |
| Comparative Example 1 | c | no film (exposure to atmosphere) | — | — | — |
| Comparative Example 2 | c | single-layer film | polyethylene 40 μm | 17500 | 2.7 |
| Comparative Example 3 | c | single-layer film | polyphenylene sulfide 115 μm | unmeasurable 100000< | unmeasurable 100000< |

| | Packing Conditions | | | | | |
|---|---|---|---|---|---|---|
| | Ratio of CO₂ Separation Membrane Volume to Gas Volume Inside Packaging Body | Filling Gas | Internal Temperature | Relative Humidity | Humidity Adjustment Method | Storage Environment |
| Example 1 | 95 | N₂ | 23° C. | 20% RH | adjust humidity of membrane in advance | atmospheric pressure, 23° C. |
| Example 7 | 95 | N2 + silica gel | 23° C. | 10% RH> | (exposure to atmosphere) | atmospheric pressure, 23° C. |
| Example 8 | 95 | N₂ | 23° C. | 30% RH | adjust humidity of N₂ | atmospheric pressure, 23° C. |
| Example 9 | 95 | N₂ | 23° C. | 35% RH | adjust humidity of N₂ | atmospheric pressure, 23° C. |
| Example 10 | 95 | N₂ | 23° C. | 40% RH | adjust humidity of N₂ | atmospheric pressure, 23° C. |
| Example 11 | 95 | N₂ | 23° C. | 50% RH | adjust humidity of N₂ | atmospheric pressure, 23° C. |
| Example 12 | 95 | N₂ | 23° C. | 70% RH | adjust humidity of N₂ | atmospheric pressure, 23° C. |
| Comparative Example 1 | — | Air | 23° C. | 30% RH> | (exposure to atmosphere) | atmospheric pressure, 23° C. |
| Comparative Example 2 | 95 | N₂ | 23° C. | 20% RH | adjust humidity of membrane in advance | atmospheric pressure, 23° C. |
| Comparative Example 3 | 95 | N₂ | 23° C. | 20% RH | adjust humidity of membrane in advance | atmospheric pressure, 23° C. |

CONCLUSION

Results of Examples 1 to 12 and Comparative Examples 1 to 5 clarified the following. That is, a contact between a facilitated transport membrane and a specific gas outside a packaging body (e.g., $CO_2$ in the atmosphere) can be sufficiently prevented by (i) putting the facilitated transport membrane, which selectively allows the specific gas to permeate therethrough, in the packaging body which includes a film having a transmission rate of not more than 10,000 $cm^3/(m^2 \cdot 24$ $h \cdot atm)$ for the specific gas and further (ii) introducing an inert gas into the packaging body. This makes it possible to prevent quality deterioration of the facilitated transport membrane for a long period of time. In other words, it has been clarified that an embodiment of the present invention makes it possible to provide a method for packing the facilitated transport membrane, which method makes it possible to prevent quality deterioration of the facilitated transport membrane for a long period of time.

INDUSTRIAL APPLICABILITY

An embodiment of the present invention can provide a method for packing a facilitated transport membrane, which method makes it possible to prevent quality deterioration of the facilitated transport membrane for a long period of time during storage and transportation of the facilitated transport membrane. Further, other embodiments of the present invention can provide a facilitated transport membrane package which is capable of preventing quality deterioration of the facilitated transport membrane for a long period of time, and a method for producing the facilitated transport membrane package.

REFERENCE SIGNS LIST

1: facilitated transport membrane
2: packaging body
10: $CO_2$ separation membrane (facilitated transport membrane)
11: $CO_2$ separation membrane module (facilitated transport membrane module)
12: feed-side chamber
13: permeation-side chamber
14: back pressure regulator
15: cold trap
16: flowmeter (FI)
17: back pressure regulator

The invention claimed is:

1. A method for packing a facilitated transport membrane selectively allowing a specific gas to permeate therethrough, the method comprising the steps of:
putting the facilitated transport membrane in a packaging body having a transmission rate of not more than 10,000 $cm^3/(m^2 \cdot 24$ $h \cdot atm)$ for the specific gas;
preventing a contact between the facilitated transport membrane and the specific gas; and
lastly sealing the packaging body,
wherein in the step of preventing a contact between the facilitated transport membrane and the specific gas, an inert gas is introduced into the packaging body, and
with regard to a ratio of a volume of the facilitated transport membrane to a volume of gas inside the packaging body at a time point when the packaging body is sealed, the ratio is adjusted so as to be in a range of not less than 0.1 and not more than 10,000.

2. The method as set forth in claim 1, wherein:
the inert gas is introduced into the packaging body so as to replace a gas inside the packaging body.

3. The method as set forth in claim 1, wherein:
the specific gas is an acid gas.

4. The method as set forth in claim 3, wherein:
the acid gas is carbon dioxide.

5. A method for packing a facilitated transport membrane selectively allowing a specific gas to permeate therethrough, the method comprising the steps of:
putting the facilitated transport membrane in a packaging body having a transmission rate of not more than 10,000 $cm^3/(m^2 \cdot 24$ $h \cdot atm)$ for the specific gas;
preventing a contact between the facilitated transport membrane and the specific gas; and
lastly sealing the packaging body,
wherein with regard to a relative humidity of gas inside the packaging body at a time point when the packaging body is sealed, the relative humidity is adjusted so as to be in a range of not less than 30% RH and not more than 90% RH at 23° C.

6. A method for producing a facilitated transport membrane package, in which a facilitated transport membrane selectively allowing a specific gas to permeate therethrough is enclosed in a packaging body, the method comprising the steps of:
putting the facilitated transport membrane in the packaging body having a transmission rate of not more than 10,000 $cm^3/(m^2 \cdot 24$ $h \cdot atm)$ for the specific gas;
preventing a contact between the facilitated transport membrane and the specific gas; and
sealing the packaging body,
wherein the specific gas is an acid gas.

7. The method as set forth in claim 6, wherein the acid gas is carbon dioxide.

8. A facilitated transport membrane package, comprising:
a packaging body; and
a facilitated transport membrane enclosed in the packaging body,
the facilitated transport membrane selectively allowing a specific gas to permeate therethrough,
the packaging body having a transmission rate of not more than 10,000 $cm^3/(m^2 \cdot 24$ $h \cdot atm)$ for the specific gas, and
the facilitated transport membrane and the specific gas being prevented from coming into contact with each other,
wherein the packaging body is sealed, and
an inert gas is introduced into the packaging body, and
with regard to a ratio of a volume of the facilitated transport membrane to a volume of gas inside the packaging body at a time point when the packaging body is sealed, the ratio is in a range of not less than 0.1 and not more than 10,000.

* * * * *